(12) United States Patent
Kang et al.

(10) Patent No.: US 8,014,982 B2
(45) Date of Patent: Sep. 6, 2011

(54) SIMULATION SYSTEM FOR A CONSTRUCTION CRANE AND THE SIMULATION METHOD THEREOF

(75) Inventors: Shih-Chung Kang, Taipei (TW); Hung-Lin Chi, Taipei (TW); Wei-Hang Hung, Taipei (TW)

(73) Assignee: National Taiwan University, Taipei (TW)

( * ) Notice: Subject to any disclaimer, the term of this patent is extended or adjusted under 35 U.S.C. 154(b) by 393 days.

(21) Appl. No.: 12/314,274

(22) Filed: Dec. 8, 2008

(65) Prior Publication Data

US 2009/0182537 A1 Jul. 16, 2009

(30) Foreign Application Priority Data

Jan. 10, 2008 (TW) ................................ 97100952 A

(51) Int. Cl.
 G06F 7/70 (2006.01)
 G06F 17/50 (2006.01)
 G06F 7/60 (2006.01)
 G06G 7/48 (2006.01)
 B66C 21/00 (2006.01)

(52) U.S. Cl. ............. 703/2; 703/1; 703/6; 703/7; 901/1; 901/2; 901/14; 901/15; 901/16; 212/83; 212/96; 701/50

(58) Field of Classification Search .................. 703/1, 2, 703/6, 7; 901/1, 2, 14–16; 212/83, 96; 701/50
See application file for complete search history.

(56) References Cited

U.S. PATENT DOCUMENTS

| | | | | |
|---|---|---|---|---|
| 5,257,177 A | * | 10/1993 | Bach et al. | 700/61 |
| 5,359,542 A | * | 10/1994 | Pahmeier et al. | 701/301 |
| 5,526,946 A | * | 6/1996 | Overton | 212/275 |
| 5,731,974 A | * | 3/1998 | Pietzsch et al. | 700/83 |
| 6,496,765 B1 | * | 12/2002 | Robinett et al. | 701/50 |
| 6,568,547 B1 | * | 5/2003 | Kretschmer et al. | 212/196 |
| 6,744,372 B1 | * | 6/2004 | Shaw et al. | 340/685 |
| 7,252,203 B2 | * | 8/2007 | Frankenberger et al. | 212/279 |
| 7,426,423 B2 | * | 9/2008 | Schneider et al. | 700/213 |
| 7,599,762 B2 | * | 10/2009 | Discenzo et al. | 701/1 |
| 7,850,024 B2 | * | 12/2010 | Schneider et al. | 212/273 |
| 7,850,025 B2 | * | 12/2010 | Neupert et al. | 212/275 |
| 2002/0008075 A1 | * | 1/2002 | Handroos et al. | 212/276 |

(Continued)

OTHER PUBLICATIONS

Kang et al., "Planning and Visualization for Automated Robotic Crane Erection Processes in Construction", Apr. 2004.*

(Continued)

*Primary Examiner* — Kamini S Shah
*Assistant Examiner* — Shambhavi Patel
(74) *Attorney, Agent, or Firm* — Bacon & Thomas, PLLC

(57) ABSTRACT

A simulation method and a simulation system for a construction crane are disclosed. The simulation system includes an input device, a processing device, and a display device. The input device is used for inputting an instruction. Furthermore, the processing device includes a computation unit, a collision detection unit, a storage unit, and a graphic unit. The computation unit is used for computing the position and the direction of each part of the construction crane and the suspension parts. The collision detection model is used for detecting whether each part of the construction crane and the suspension parts will be in collision. Besides, the data obtained from the simulation method performed in the simulation system is saved in the storage unit. The graphic unit displays the 3D dynamics images of the construction crane and the suspension parts on the display device, corresponding to the data obtained from the computation unit.

13 Claims, 5 Drawing Sheets

U.S. PATENT DOCUMENTS

2006/0074517 A1* 4/2006 Schneider et al. ............ 700/213
2008/0004898 A1* 1/2008 Hubler et al. ..................... 705/1
2008/0053945 A1* 3/2008 Schneider et al. ............ 212/276

OTHER PUBLICATIONS

Miranda et al. "Physics Based Model for Simulating the Dynamics of Tower Cranes", Apr. 2004.*

Korkealaako et al. "Development of a Real-Time Simulation Environment", Multibody Syst Dyn (Mar. 2007) 17:177-194.*

Kang et al., "Planning and Visualization for Automated Robotic Crane Erection Processes in Construction", Automation in Construction 15 (2006) 398-414.*

Miranda et al. "Physics Based Model for Simulating the Dynamics of Tower Cranes", Apr. 2004.*

Korkealaako et al. "Development of a Real-Time Simulation Environment", Multibody Syst Dyn (Mar. 2007) 17:177-194.*

Kang, ShihChung. Automated Simulation of the Erection Activities in Virtual Construction, Apr. 2004.*

Langen et al., "Simulation of Dynamic Behaviour of a FPSO Crane", Nov. 2003.*

Martinez, et al. "General-Purpose Systems for Effective Construction Simulation", Journal of Construction Engineering and Management / Jul./Aug. 1999.*

Osumi et al. "Cooperative Control Between Multiple Manipulators With Flexibility", Proceedings of the 1993 IEEURSJ International Conference on Intelligent Robots and Systems, 1993.*

Clayton et al. "Virtual construction of architecture using 3D CAD and simulation", Automation in Construction 2002, 227-235.*

* cited by examiner

SIMULATION SYSTEM FOR A CONSTRUCTION CRANE AND THE SIMULATION METHOD THEREOF

BACKGROUND OF THE INVENTION

1. Field of the Invention

This invention relates to a simulation system and a simulation method, particularly to a simulation system for simulating a construction crane and a simulation method thereof.

2. Description of Related Art

In modern building construction, a construction crane serves as a dominating role. Taking a steel-based building construction as an example, about 25% of the cost is directly in connection with the construction crane and the operation thereof. Therefore, the efficiency of the crane operation is an important issue in studying the building construction. A proper construction crane simulation can provide digitized and visualized information such that an operator thereof is capable of obtaining sufficient information on the constructing process through the crane simulation in advance, thereby avoiding problems possibly occurring in the actual crane operation. Besides, the current construction crane operation is more complicated than the traditional ones. The outline of the constructing member of a building is more versatile, thus a precise and careful construction crane operation is required. In addition, a prefabricated construction method employs more construction crane operation. Therefore, in the modern construction technology, a precise planning of the crane operation on a computer is considerably required.

In recent years, the computer-visualized technology in crane behavior is widely used to facilitate the planning and training of crane operation, with any limitations on space and time. It is easier for a crane operator to understand the planning of crane operation in computer visualization than in conventional paper planning. The simulation systems employing the computer visualization technology include: teaching simulation system, semi-automatic simulation system and automatic simulation system. In the teaching simulation system, two companies, i.e. the SimLog and the CMLabs, each provide a commercialized simulation system of a construction crane operation. The teaching simulation system provides customization and harmonized environment for a construction crane operator to manipulate a virtual construction crane. Such a system can customize a specialized operation scenario upon the special requirement of the customer.

The semi-automatic simulation system generally employs animation software, such as the 3D studio Max or the Maya. The main approach of the semi-automatic simulation system is to define an important picture or instruction for a virtual target. The semi-automatic simulation system automatically derives a series of actions. A user has to set key pictures in the animation. Such a technique is suitable to plan the moving direction of the construction crane during the crane operation. However, if the precise movements of the construction crane are to be simulated, the user must input a lot of key pictures for determining the reasonable actions in each picture. Therefore, it is not efficient to animate complicated construction crane actions.

The automatic simulation system incorporates modern search processing, trial-and-error technique from digitized movement science, and movement planning to produce movement of a virtual construction crane automatically. The user only needs to set the initial conditions of a constructing scene and a computer will determine a highly efficient, safe and non-colliding route for simulating the construction crane behavior. Such a technique in general is used to assist construction crane planning and allows an operator, to know the defective aspects of the plan and resolve them on the computer in advance, by optimization of the construction crane operation route. However, the most difficult point of such an automatic simulation system is whether the planning route or the movement of the construction crane can be exactly implemented in a practical crane operation.

Due to versatilities of the constructing member of a building, the modern construction crane operation is more complicated than the traditional ones. The simulation system requires detailed description on the construction crane behavior in order to increase the reality of the simulation. As a result, the above-mentioned simulation systems are merely used in simulation simple scene.

In order to achieve other objectives, such as planning the crane operation and verifying the feasibility and the reasonability of the plan of the crane operation, the present invention proposes a technique for simulating the practical crane operation, so as to increase the virtual reality of the crane operation through simulating physical behaviors close to the real environment. Thus, the whole crane operation can be simulated in detail, and the feasibility and the colliding possibility in the construction route can also be evaluated easily. As a result, the construction crane operation plan is more reliable.

SUMMARY OF THE INVENTION

Due to the insufficiency of the virtual reality of the conventional simulation systems for a construction crane planning, the invention provides a simulation method for a simulation system of a construction crane. The construction crane simulation system builds a construction crane numerical model, comprising a manipulation crane model and a non-manipulating suspension model. The manipulation crane model includes a numerical model of the parts, such as a track, a body and a suspension arm of the construction crane, for simulating the continuous movements of the manipulating and rigid parts of the construction crane. Besides, the non-manipulating suspension model includes a numerical model of the parts, such as a suspension cable and suspension hook of the construction crane, for simulating the physical behaviors of the vibration of the non-manipulating parts and the dynamic behaviors of the non-manipulating parts after the collision.

According to the invention, the simulation method for a construction crane system, in which a construction crane numerical model built in the construction crane system includes a manipulation crane model and a non-manipulating suspension model, comprises the following steps: (A) receiving an instruction to produce varying quantities of parameters in position and direction of each of movable parts of the manipulation crane model; (B) accumulating the parameters in position and direction of each of the movable parts of the manipulation crane model; (C) extracting parameters in position and direction of a connection point between the manipulation crane model and the non-manipulating suspension model, and substituting the parameters in position and direction of the connection point into the non-manipulating suspension model; (D) performing a matrix computation with the parameters of the non-manipulating suspension model to obtain data in position and direction of each part of the non-manipulating suspension model; and (E) determining whether a collision will occur based on the parameters in position and direction of each part of the construction crane, if the collision will occur, adding a limiting condition of collision into the construction crane numerical model for computing the data in position and direction of each part of the construction crane.

The detail of the simulation method for a construction crane system according to the invention is described as below. First, a user inputs an instruction to produce varying quantities of parameters in position and direction of each of movable parts of the manipulation crane model. The method then accumulates the parameters in position and direction of each of the movable parts of the manipulation crane model (for example, a track, a body and a suspension arm). Later, the method extracts parameters in position and direction of a connection point between the manipulation crane model and the non-manipulating suspension model, and substitutes the parameters in position and direction of the connection point into the non-manipulating suspension model. Next, the method performs a matrix computation with the parameters of the non-manipulating suspension model to obtain data in position and direction of each part of the non-manipulating suspension model (for example, a suspension cable and suspension hook). Besides, the method will determine whether a collision will occur based on the parameters in position and direction of each part of the construction crane. If the collision will occur, a limiting condition of collision is added into the construction crane numerical model for computing the data in position and direction of each part of the construction crane. Finally, the method provides a graphing of the three-dimensional dynamic images based on the data in position and direction of the manipulation crane model and the non-manipulating suspension model. The graphing is then output to a display device.

The simulation method for a construction crane system provided by the invention includes numerical models of the suspension cable and the suspension hook of the construction crane to simulate the dynamic physical behaviors of the practical vibration and the collision of the parts of the suspension cable and suspension hook, thereby a detailed simulation of the crane operation is provided. Therefore, the reality of the simulation is increased, and the difference between the simulation and the practical operation is also minimized.

The construction crane simulation system of the invention comprises an input device, a processing device and a display device. The input device receives an instruction or provides a user's input instruction to manipulate a virtual construction crane in the simulation system. The processing device includes a computation unit, a collision detection unit, a storage unit and a graphic unit. The computation unit is used for performing a matrix computation of a construction crane numerical model (including a manipulation crane model and a non-manipulating suspension model) to obtain the position and the direction of each part of the construction crane (for example, a track, a body, a suspension arm, a suspension cable and a suspension hook) during the simulating process. The collision detection unit is capable of detecting whether a collision will occur for each part of the construction crane. If the collision will occur, a limiting condition of collision is added into the construction crane numerical model for further computing the position and the direction of each part of the construction crane. If the collision will not occur, the data in the position and the direction of each part of the construction crane obtained from the simulating process is converted into a three-dimensional dynamic image through the graphic unit. The simulating process of the construction crane operation will be recorded in the storage unit. The three-dimensional dynamic image of the construction crane is presented on the display device, after the completion of the simulation.

In the invention, the input device may be a keyboard, a mouse, a joystick or a controlling platform. The display device may be a flat panel display, a combination of a plurality of flat panel displays or projection equipment. The construction crane simulation system, incorporating with the above-mentioned devices, allows the user to manipulate a construction crane in the virtual environment and to simulate in detail each kind of crane operation that may occur. Therefore, the user can evaluate the feasibility and the colliding possibility in the construction route in advance, and can make the actual construction crane operation more efficient and more safe.

DETAILED DESCRIPTION OF THE PREFERRED EMBODIMENT

Figure 1:
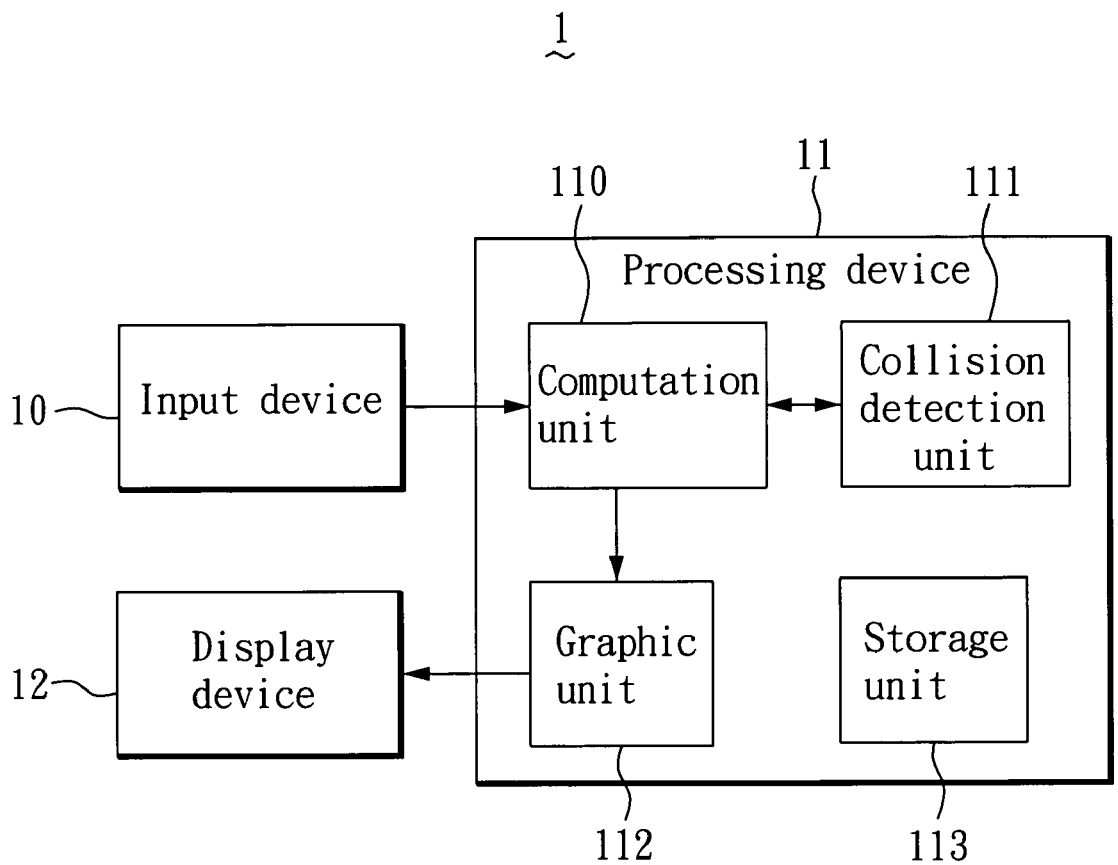
FIG. 1 is a block diagram showing a simulation system for a construction crane according to a preferred embodiment of the invention.

FIG. 1 relates to a construction crane simulation system and the simulation method thereof. FIG. 1 is a block diagram showing a simulation system 1 for a construction crane according to a preferred embodiment of the invention. The simulation system 1 includes an input device 10, a processing device 11 and a display device 12. The input device 10 receives the instruction input by a user, for manipulating a virtual construction crane in the simulation system 1. The processing device 11 includes a computation unit 110, a collision detection unit 111, a storage unit 113 and a graphic unit 112. The computation unit 110 is used for performing a matrix computation of a construction crane numerical model, so as to obtain the position and the direction of each part of the construction crane during the simulating process. The collision detection unit 111 is capable of detecting whether a collision will occur for each part of the construction crane. If the collision will occur, a limiting condition of collision is added into the construction crane numerical model for computing the position and the direction of each part of the construction crane. If the collision will not occur, the data in the position and the direction of each part of the construction crane obtained from the simulating process is converted into a three-dimensional dynamic image through the graphic unit 112. The simulating process of the construction crane operation will be recorded in the storage unit 113. The three-dimensional dynamic image of the construction crane is presented on the display device, after the completion of the simulation.

Figure 2:
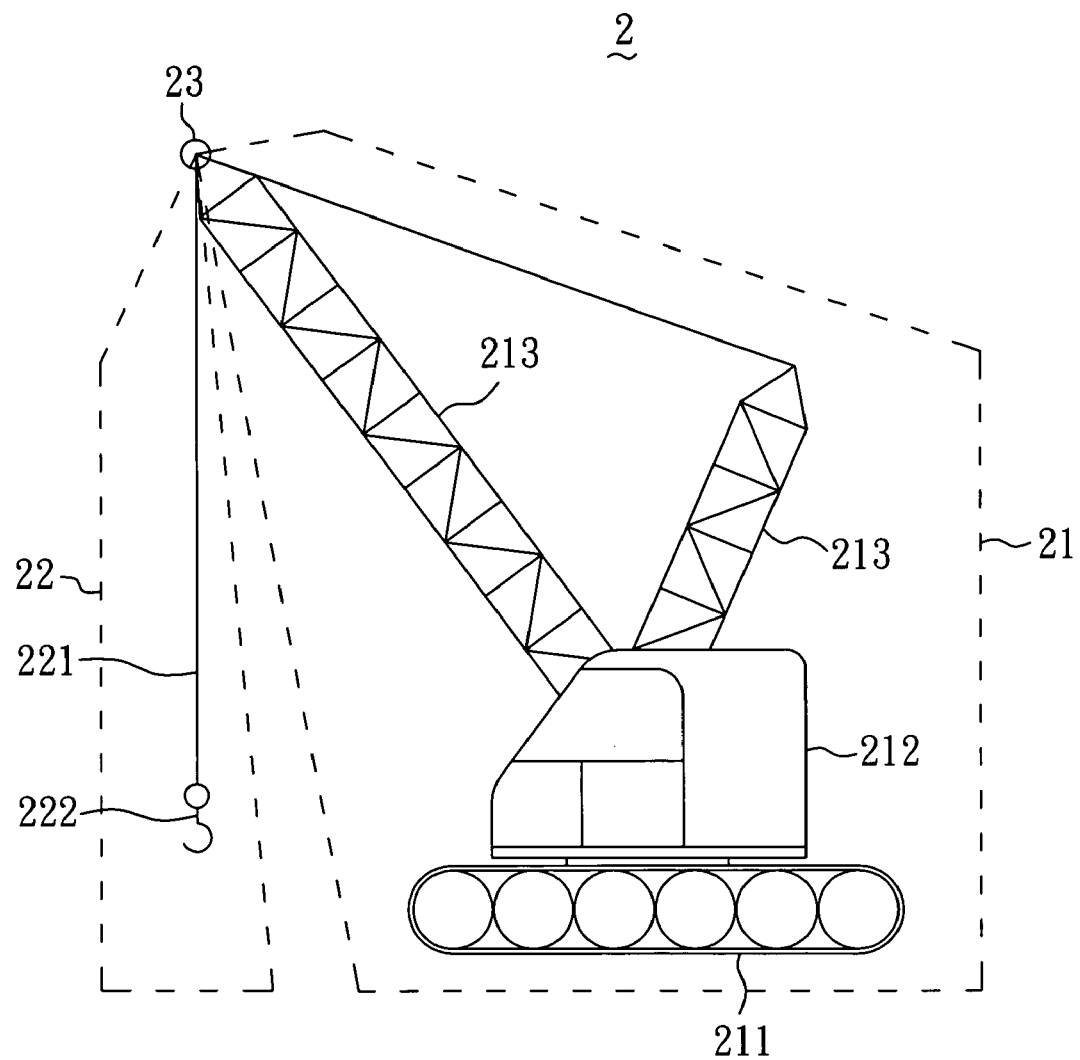
FIG. 2 is a schematic diagram showing a numerical model for a construction crane according to a preferred embodiment of the invention.

Please refer to FIG. 2, which is a schematic diagram showing a numerical model 2 for a construction crane according to a preferred embodiment of the invention. The invention develops a digitized construction crane model with respect to the physical characteristics of the construction crane. The numerical model 2 for a construction crane is divided into a manipulation crane model 21 and a non-manipulating suspension model 22, based on the moving properties of each part of the construction crane. The manipulation crane model 21 includes a numerical model of the rigid parts, such as a track 211, a body 212 and a suspension arm 213 of the construction crane. The non-manipulating suspension model 22 includes a numerical model of the dynamic parts, such as a suspension cable 221 and a suspension hook 222 of the construction crane. The simulation system verifies the variable quantity of the rigid position of the track 211, the body 212 and the suspension arm 213. Besides, the simulation system introduces the variable quantity, serving as an external force, into the non-manipulating suspension model 22, so as to determine the movement of the dynamic parts of the suspension cable 221 and suspension hook 222. Therefore, the physical behaviors of the real swinging of the suspension cable 221 and suspension hook 222 can be simulated.

The manipulation crane model 21 is configured according to the forward kinematics. The forward kinematics define the subordinate structure of the linking of each part of the construction crane and coordinates the conversion computation for obtaining the geometrical position of each part of the construction crane part in a virtual environment. As a result, when incorporating with the operation instruction input by a user, the movement and the action of the virtual construction crane can be dynamically reflected. The non-manipulating suspension model 22 is configured according to the constraint-based rigid body dynamics. The constraint-based rigid body dynamics describes the movement limitation of each of the parts. The data in position and direction of each of the parts under the limitation of force effect is obtained and the physical behaviors similar to those in the real world are also presented. Therefore, the simulation system for a construction crane of the invention is capable of providing a detailed simulation for the construction crane operation. As a result, the reality of the simulation is increased, and the difference between the simulation and the practical operation is also minimized.

Figure 3:
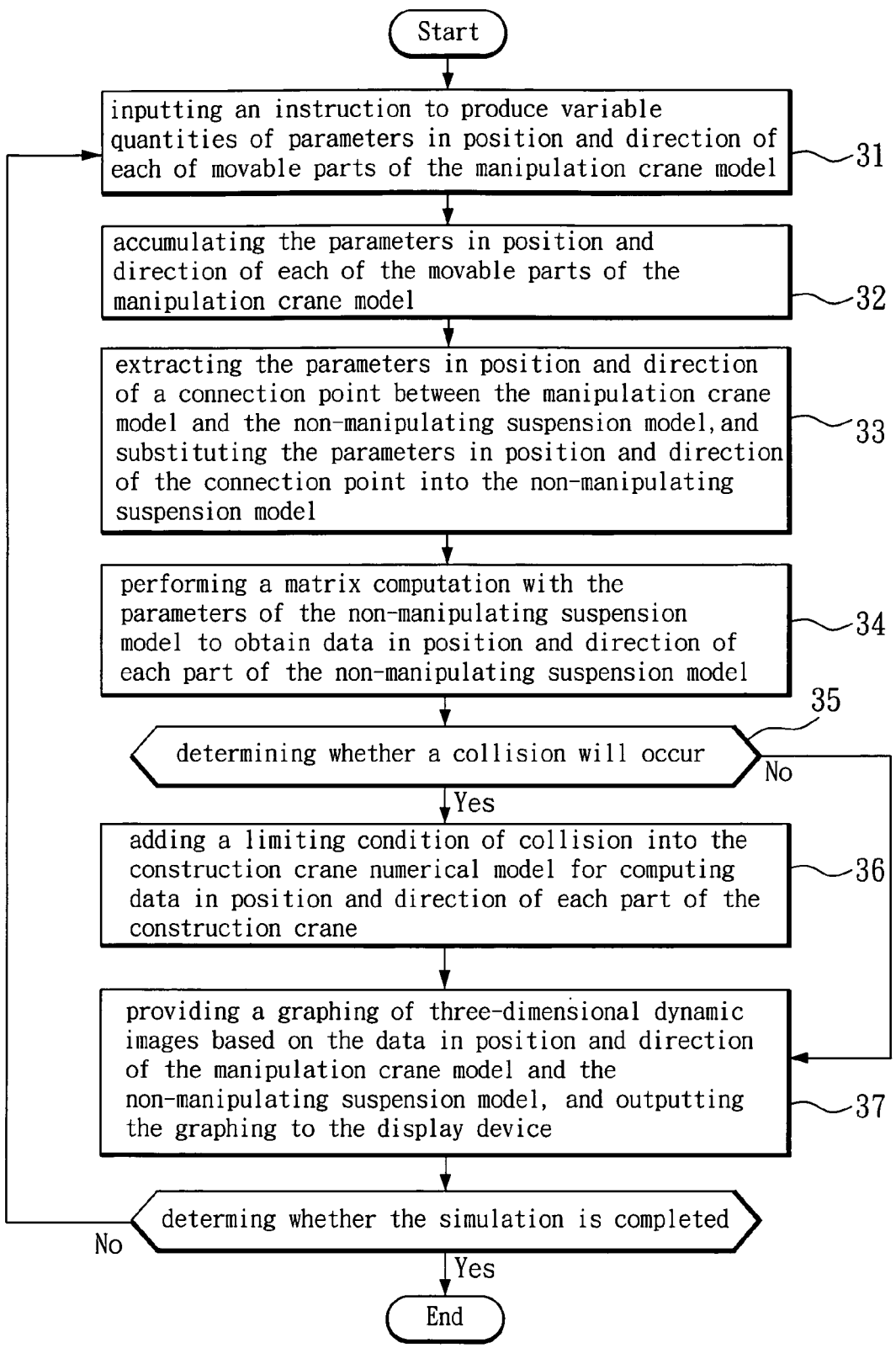
FIG. 3 is a flow chart illustrating a simulation method for a construction crane system according to a preferred embodiment of the invention.

Please refer to FIG. 3, which is a flow chart illustrating a simulation method for a construction crane system according to a preferred embodiment of the invention. Besides, please also refer FIG. 1 and FIG. 2. First, a user inputs, via the input device 10, an instruction to produce variable quantities of parameters in position and direction of each of movable parts of the manipulation crane model 21, such as the track 211, the body 212 and the suspension arm 213 (step 31). The simulation method will accumulate the parameters in position and direction of each of the movable parts of the manipulation crane model 21 (step 32). Later, the simulation method extracts the parameters in position and direction of a connection point 23 (shown in FIG. 2) between the manipulation crane model 21 and the non-manipulating suspension model 22, and substitutes the parameters in position and direction of the connection point into the non-manipulating suspension model 22 (step 33). Next, the method performs a matrix computation with the parameters of the non-manipulating suspension model 22 to obtain data in position and direction of each part of the non-manipulating suspension model 22, such as the suspension cable 221 and suspension hook 222 (step 34). The system will then determine whether a collision will occur based on the parameters in position and direction of each part of the construction crane, such as the track 211, body 212, suspension arm 213, suspension cable 221 and suspension hook 222 (step 35). If the collision will occur, a limiting condition of collision is added into the construction crane numerical model for computing the data in position and direction of each part of the construction crane as mentioned above (step 36). Finally, the method provides a graphing of the three-dimensional dynamic images based on the data in position and direction of the manipulation crane model 21 and the non-manipulating suspension model 22. The graphing is then output to the display device 12 (step 37).

In the preferred embodiment, the input device 10 may be a keyboard, a mouse, a joystick or a controlling platform. Besides, the display device 12 may be a flat panel display, a combination of a plurality of flat panel displays or projection equipment. The construction crane simulation system, incorporating with the above-mentioned devices, allows the user to manipulate a construction crane in the virtual environment and to simulate in detail each kind of crane operation that may occur. Therefore, the user can evaluate the feasibility and the colliding possibility in the construction route in advance, and can make the actual construction crane operation more efficient and more safe.

Figure 4:
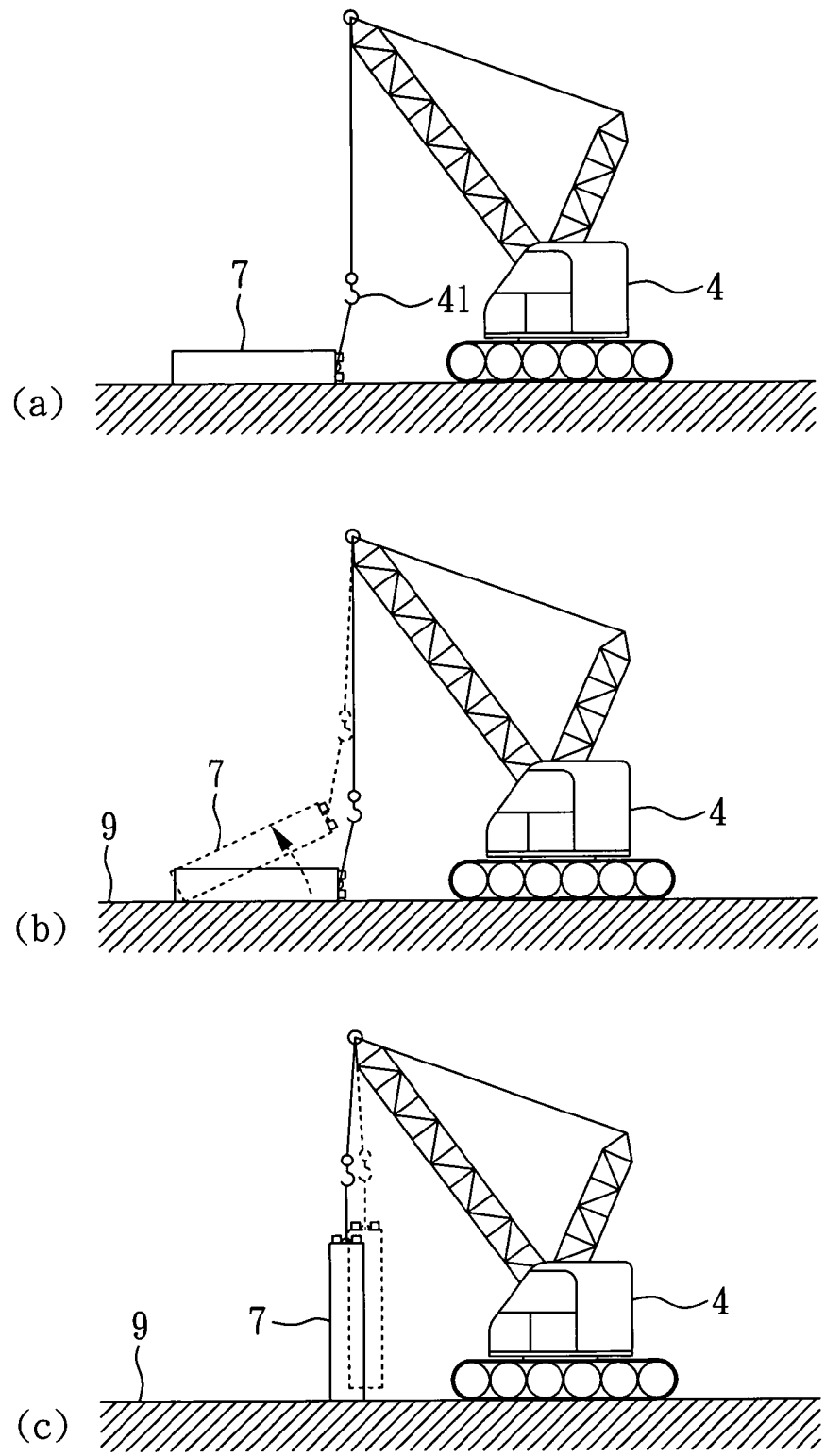
FIG. 4 is a schematic diagram showing the simulating process of the simulation for a construction crane hanging a pillar-shaped object according to a preferred embodiment of the invention.
Figure 5:
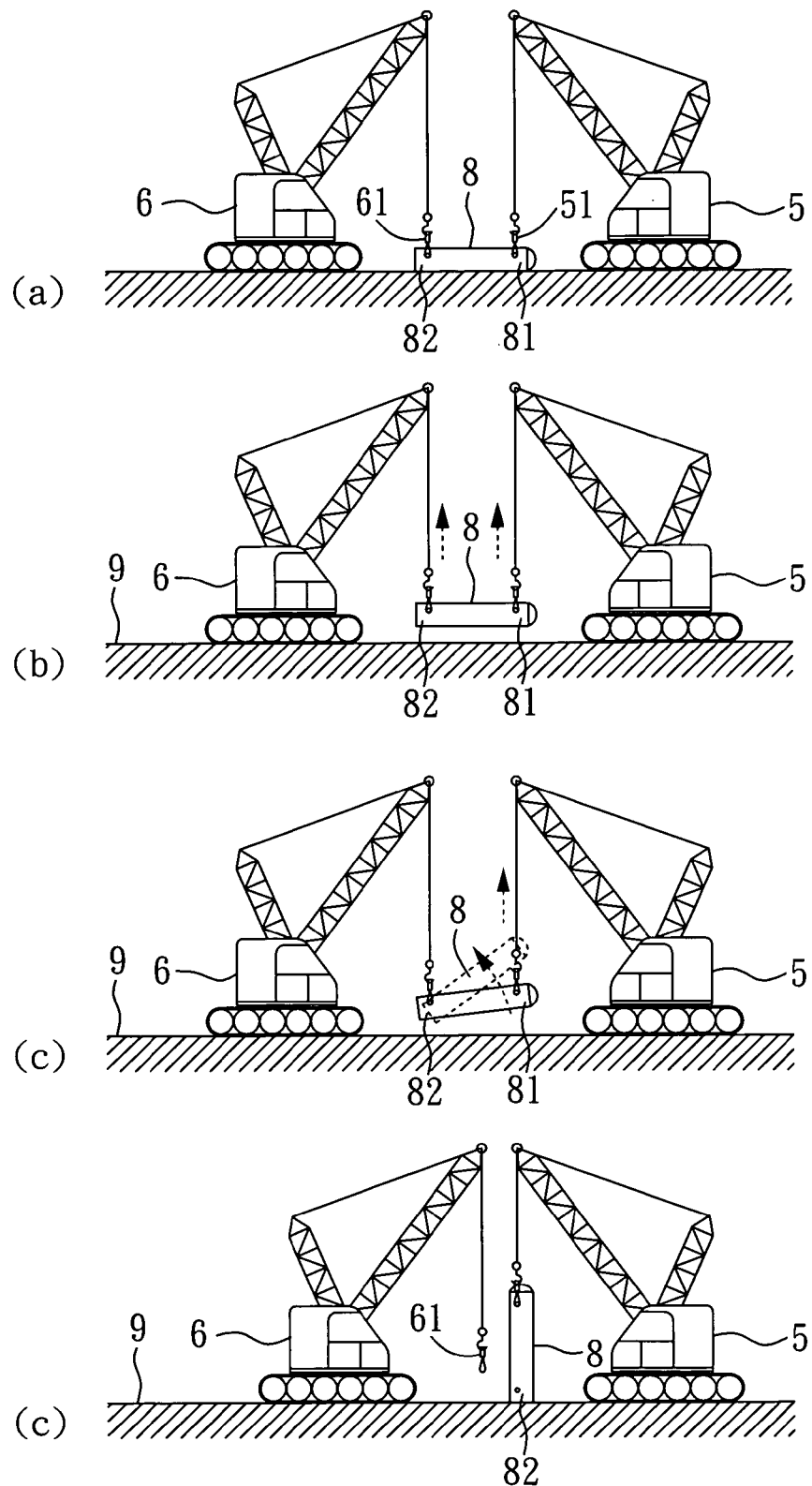
FIG. 5 is a schematic diagram showing the simulating process of the simulation for two construction cranes hanging an oil tank cooperating with each other according to a preferred embodiment of the invention.

To have a better understanding of the technical contents of the invention, embodiments of simulating the operation of suspending a pillar-shaped object, and the operation of suspending an oil tank with two construction cranes cooperating with each other are additionally provided for explanation, as shown in FIG. 4 and FIG. 5.

Please refer to FIG. 4. It is a schematic diagram showing the simulating process of the simulation for a construction crane suspending a pillar-shaped object according to the invention. As shown from FIG. 4(a) to FIG. 4(c), a suspension hook 41 of a virtual construction crane 4 links a pillar-shaped object 7 (as shown in FIG. 4(a)). In the embodiment, the pillar-shaped object 7 is a major object, such as a pillar, a cylinder, a steel pillar or a container. A user manipulates the virtual construction crane 4 through the input device 10, for raising the pillar-shaped object 7 (as shown in FIG. 4(b)) and making the pillar-shaped object 7 gradually become perpendicular to a ground 9. In the practical crane operation, an operator has to raise the pillar-shaped object 7 with minimum swinging movement, until the pillar-shaped object 7 leaves and becomes perpendicular to the ground 9. Then, the construction crane transports the pillar-shaped object 7 through a non-colliding route to a predetermined position, and puts down the pillar-shaped object 7 (as shown in FIG. 4(c)). Therefore, the simulation of the construction crane suspending a pillar-shaped object 7 is completed.

In the modern building construction, the above-mentioned crane operation takes most of the operation time of a construction crane. To reduce the cost of the crane operation and increase the speed of the building construction, it is necessary to control the progress of the crane operation and plan a highly efficient working route in advance. The simulation system of the invention is capable of providing repetitive tests with respect to the complicated construction crane operations in a virtual environment, and therefore can assist planning the process of the crane operations in detail.

In a practical building project, an operation with two construction cranes means a highly risky and specific building case, in particular to a unique and major construction object, such as an oil tank. Such a construction crane operation of the voluminous object needs to manipulate two construction cranes simultaneously, so as to maintain the stability of the object during the crane operation. Please refer to FIG. 5. It is a schematic diagram showing the simulating process of the simulation for two construction cranes suspending an oil tank according to a preferred embodiment of the invention, including FIG. 5(a) to FIG. 5(d).

Firstly, a suspension rack 51 of a first virtual construction crane 5 is fixed at a top 81 of an oil tank 8 and a suspension rack 61 of a second virtual construction crane 6 is fixed at a bottom 82 of the oil tank 8 (as shown in FIG. 5(*a*)). The first virtual construction crane 5 raises the top 81 of the oil tank 8. Meanwhile, the second virtual construction crane 6 keeps the oil tank 8 stable, in order to reduce the swinging movement of the oil tank 8. The second virtual construction crane 6 then raises the bottom 82 of the oil tank 8, until the oil tank 8 is raised to a proper height from a ground 9 (as shown in FIG. 5(*b*)). Then, the first virtual construction crane 5 continuously raises the top 81 of the oil tank 8, while the second virtual construction crane 6 moves toward the first virtual construction crane 5 stably, for making the oil tank 8 gradually rise perpendicular to the ground 9 (as shown in FIG. 5(*c*)). Lastly, as the oil tank 8 is completely placed on the ground 9 perpendicularly, the suspension rack 61 of the second virtual construction crane 6 is separated from the bottom 82 of the oil tank 8 (as shown in FIG. 5(*d*)). After the first virtual construction crane 5 completes the remaining crane operations, the simulation of the crane operation suspending the oil tank with two construction cranes is finished.

The incorporation operation with two construction cranes not only requires good operation skills, but also requires excellent coordination ability between the two operators of the two construction cranes. Due to the particularity and the high cost of the incorporating operation with two construction cranes, in the field dedicated to the construction crane planning, the incorporating operation with two construction cranes is deemed as a key working item requiring a detailed plan before the actual operation. Therefore, it is necessary to plan the incorporation operation with two construction cranes assisted by a construction crane simulation system in detail, while improving the skill of the operators to manipulate the construction cranes, thereby reducing the risk of the construction crane operations.

Although the present invention has been explained in relation to its preferred embodiment, it is to be understood that many other possible modifications and variations can be made without departing from the spirit and scope of the invention as hereinafter claimed.

What is claimed is:

1. A simulation method for a construction crane system implemented in a simulation system including an input device, a display device, and a processing device having a computation unit, a collision detection unit and a graphic unit, in which a construction crane numerical model built in the construction crane system includes a manipulation crane model and a non-manipulating suspension model, the method comprising the steps of:
   (A) the input device receiving an instruction to produce varying quantities of parameters in position and direction of each of movable parts of the manipulation crane model;
   (B) the processing device accumulating the parameters in position and direction of each of the movable parts of the manipulation crane model;
   (C) the processing device extracting parameters in position and direction of a connection point between the manipulation crane model and the non-manipulating suspension model, and substituting the parameters in position and direction of the connection point into the non-manipulating suspension model;
   (D) the computation unit performing a matrix computation with the parameters of the non-manipulating suspension model to obtain data in position and direction of each part of the non-manipulating suspension model; and
   (E) the collision detection unit determining whether a collision will occur based on the parameters in position and direction of each part of the construction crane, if the collision will occur, adding a condition of collision into the construction crane numerical model for computing the data in position and direction of each part of the construction crane.

2. The method as claimed in claim 1, further comprising the step of:
   (F) the graphic unit providing a graphing based on data in position and direction of the manipulation crane model and the non-manipulating suspension model and outputting the graphing to the display device.

3. The method as claimed in claim 1, wherein the manipulation crane model is configured according to the forward kinematics.

4. The method as claimed in claim 1, wherein the manipulation crane model is selected from a numerical model of one of the following manipulating parts: a track, a body and a suspension arm of the construction crane, so as to simulate the continuous movements of the manipulating parts.

5. The method as claimed in claim 1, wherein the non-manipulating suspension model is configured according to the constraint-based rigid body dynamics.

6. The method as claimed in claim 1, wherein the non-manipulating suspension model is selected from a numerical model of one of the following non-manipulating parts: a suspension cable and a suspension hook of the construction crane, so as to simulate the dynamic behaviors of the vibration of the non-manipulating parts and the dynamic behaviors of the non-manipulating parts after the collision.

7. A simulation system for a construction crane, comprising:
   an input device for receiving an instruction to produce varying quantities of parameters in position and direction of each of movable parts of the manipulation crane model;
   a processing device for accumulating the parameters in position and direction of each of the movable parts of the manipulation crane model, and for extracting parameters in position and direction of a connection point between the manipulation crane model and the non-manipulating suspension model, and substituting the parameters in position and direction of the connection point into the non-manipulating suspension model, the processing device including:
      a computation unit for performing a matrix computation with the parameters of the non-manipulating suspension model to obtain data in position and direction of each part of the non-manipulating suspension model during simulation;
      a collision detection unit for detecting whether a collision will occur based on the parameters in position and direction of each part of the construction crane, if the collision will occur, adding a condition of collision into the construction crane numerical model for computing the data in position and the direction of each part of the construction crane;
      a storage unit for recording the simulating process; and
      a graphic unit for converting the data obtained from the simulating process into a three-dimensional dynamic image; and
   a display device for presenting the three-dimensional dynamic image after the completion of the simulation.

8. The system as claimed in claim 7, wherein the manipulation crane model is configured according to the forward kinematics.

9. The system as claimed in claim 7, wherein the manipulation crane model is selected from a numerical model of one of the following manipulating parts: a track, a body and a suspension arm of the construction crane, so as to simulate the continuous movement of the manipulating parts.

10. The system as claimed in claim 7, wherein the non-manipulating suspension model is configured according to the constraint-based rigid body dynamics.

11. The system as claimed in claim 7, wherein the non-manipulating suspension model is selected from a numerical model of one of the following non-manipulating parts: a suspension cable and a suspension hook of the construction crane, so as to simulate the dynamic behaviors of vibration of the non-manipulating parts and the dynamic behaviors of the non-manipulating parts after the collision.

12. The system as claimed in claim 7, wherein the input device is a keyboard, a mouse, a joystick or a controlling platform.

13. The system as claimed in claim 7, wherein the display device is a flat panel display, a combination of a plurality of flat panel displays or projection equipment.

* * * * *